US010400699B2

(12) United States Patent
Kamiya et al.

(10) Patent No.: US 10,400,699 B2
(45) Date of Patent: Sep. 3, 2019

(54) ABNORMALITY DETERMINATION DEVICE

(71) Applicant: DENSO CORPORATION, Kariya, Aichi-pref. (JP)

(72) Inventors: Yuto Kamiya, Kariya (JP); Shohei Fujita, Kariya (JP)

(73) Assignee: DENSO CORPORATION, Kariya (JP)

( * ) Notice: Subject to any disclaimer, the term of this patent is extended or adjusted under 35 U.S.C. 154(b) by 172 days.

(21) Appl. No.: 15/606,106

(22) Filed: May 26, 2017

(65) Prior Publication Data

US 2017/0342933 A1 Nov. 30, 2017

(30) Foreign Application Priority Data

May 30, 2016 (JP) ................................ 2016-107374

(51) Int. Cl.

| | |
|---|---|
| ***G01N 27/416*** | (2006.01) |
| ***F02D 41/22*** | (2006.01) |
| ***F02D 41/02*** | (2006.01) |
| ***F02D 41/30*** | (2006.01) |
| ***F02D 41/14*** | (2006.01) |
| *F02D 41/20* | (2006.01) |
| *F02D 41/28* | (2006.01) |

(52) U.S. Cl.

CPC ......... *F02D 41/222* (2013.01); *F02D 41/021* (2013.01); *F02D 41/1495* (2013.01); *F02D 41/3005* (2013.01); *F02D 2041/2089* (2013.01); *F02D 2041/2093* (2013.01); *F02D 2041/281* (2013.01)

(58) Field of Classification Search

CPC ......... F02D 41/1495; F02D 2041/2093; F02D 2041/2089

See application file for complete search history.

(56) References Cited

U.S. PATENT DOCUMENTS 6,136,169 A * 10/2000 Okamoto ............ F02D 41/1495 123/688
6,818,120 B2 * 11/2004 Nakamichi ......... F02D 41/1495 123/688
7,536,244 B2 * 5/2009 Kunihiro ............ F02D 41/1495 123/479

FOREIGN PATENT DOCUMENTS

JP 2008-14809 A 1/2008
JP 2010-256233 A 11/2010
JP 4643459 B2 12/2010

* cited by examiner

*Primary Examiner* — Hieu T Vo
*Assistant Examiner* — Arnold Castro
(74) *Attorney, Agent, or Firm* — Posz Law Group, PLC

(57) ABSTRACT

An abnormality determination device includes an injection instructor that realizes a rich state of an air-fuel ratio in an exhaust gas by sending an instruction of (i) stopping an application of bias to a plus terminal and (ii) adjusting a fuel injection amount from an injector. The abnormality determination device also includes an abnormality determiner that distinctively determines abnormality of, i.e., in terms of which one of, the plus terminal or a minus terminal having a short circuit to a power supply or a ground failure by detecting an electromotive force of an air-fuel ratio sensor when the air-fuel ratio in the exhaust gas is in the rich state according to the instruction of the injection instructor.

9 Claims, 11 Drawing Sheets

| | PLUS TERMINAL | MINUS TERMINAL |
|---|---|---|
| PLUS SIDE SHORT CIRCUIT | +B | +B |
| MINUS SIDE SHORT CIRCUIT | +B+0.9V | +B |
| PLUS SIDE GROUND FAILURE | 0V | 0V |
| MINUS SIDE GROUND FAILURE | 0.9V | 0V |

ABNORMALITY DETERMINATION DEVICE

CROSS REFERENCE TO RELATED APPLICATION

The present application is based on and claims the benefit of priority of Japanese Patent Application No. 2016-107374, filed on May 30, 2016, the disclosure of which is incorporated herein by reference.

TECHNICAL FIELD

The present disclosure generally relates to an abnormality determination device for determining abnormality of an air-fuel ratio sensor.

BACKGROUND INFORMATION

Air-fuel ratio sensor is used to detect a ratio of excess air in the exhaust gas of the internal-combustion engine, and various techniques have been proposed for the detection of abnormality of such air-fuel ratio sensor. For example, according to a technique disclosed in a patent document 1, Japanese Patent Laid-Open No. 2010-256233 (patent document 1), a Central Processing Unit (CPU) is configured to detect abnormality of a sensor element based on an air-fuel (A/F) detection voltage, and a terminal voltage of a sensor.

According to the technique of the patent document 1, an abnormality in a sensor control is identifiable. However, according to the technique of the patent document 1, even though it is distinctively/distinguishably determinable whether a short-circuit occurs as (i) an inter-terminal short-circuit as to two terminals of an air-fuel ratio sensor, or (ii) a battery voltage (VB) short-circuit as to one or both of two terminals of the air-fuel ratio sensor short-circuiting to a power source, which one of an upstream terminal or a downstream terminal is short-circuiting to a power source or to a ground is not determinable.

More practically, the technique in the patent document 1 cannot tell which one of a plus terminal or a minus terminal has a short circuit to a power supply or a ground failure, because, in both of a power source short-circuit case and a ground short-circuit case, a voltage of both of the plus and minus terminals adheres to a ground voltage, making it difficult to distinguish one from the other.

SUMMARY

It is an object of the present disclosure to provide an abnormality determination device that is capable of distinctively determining which one of the plus terminal or the minus terminal has the short circuit to a power supply or the ground failure.

In an aspect of the present disclosure, an abnormality determination device determines an abnormality of an air-fuel ratio sensor (4, 204) that detects an air-fuel ratio in an exhaust gas of an internal combustion engine. The air-fuel ratio sensor has a plus terminal (S+, IP) and a minus terminal (S−, UN). The abnormality determination device also sends an instruction to apply a bias to the plus terminal and the minus terminal of the air-fuel ratio sensor.

The abnormality determination device includes an injection instructor instructs (i) an adjustment of a fuel injection amount from an injector and (ii) a stop of application of the bias to the plus terminal to bring the air-fuel ratio in the exhaust gas to a rich state. Also, the abnormality determination device includes an abnormality determiner that (i) detects an electromotive force of the air-fuel ratio sensor when the air-fuel ratio in the exhaust gas is brought to the rich state by the injection instructor, and (ii) determines which one of the plus terminal or the minus terminal has a short circuit to a power supply or a ground failure, according to the detected electromotive force of the air-fuel ratio sensor.

In such manner, the abnormality determination device is capable of determining which one of the plus terminal or the minus terminal has a short circuit to a power supply or a ground failure.

BRIEF DESCRIPTION OF THE DRAWINGS

Objects, features, and advantages of the present disclosure will become more apparent from the following detailed description made with reference to the accompanying drawings, in which:

FIG. 7 is a timing chart about a voltage of the sensor, an injection amount, an air-fuel ratio value and the like;

FIG. 8 is a table diagram of abnormality reference voltages for a detection of abnormality of a plus terminal and a minus terminal;

DETAILED DESCRIPTION

Hereafter, embodiments of an abnormality determination device for detecting abnormality of the air-fuel ratio sensor are described.

In the following embodiments, identical numerals are assigned to the same/similar configuration/function for the description of the configuration/function, and the same description of the same/similar configuration/function is not repeated as required.

First Embodiment

Figure 1:
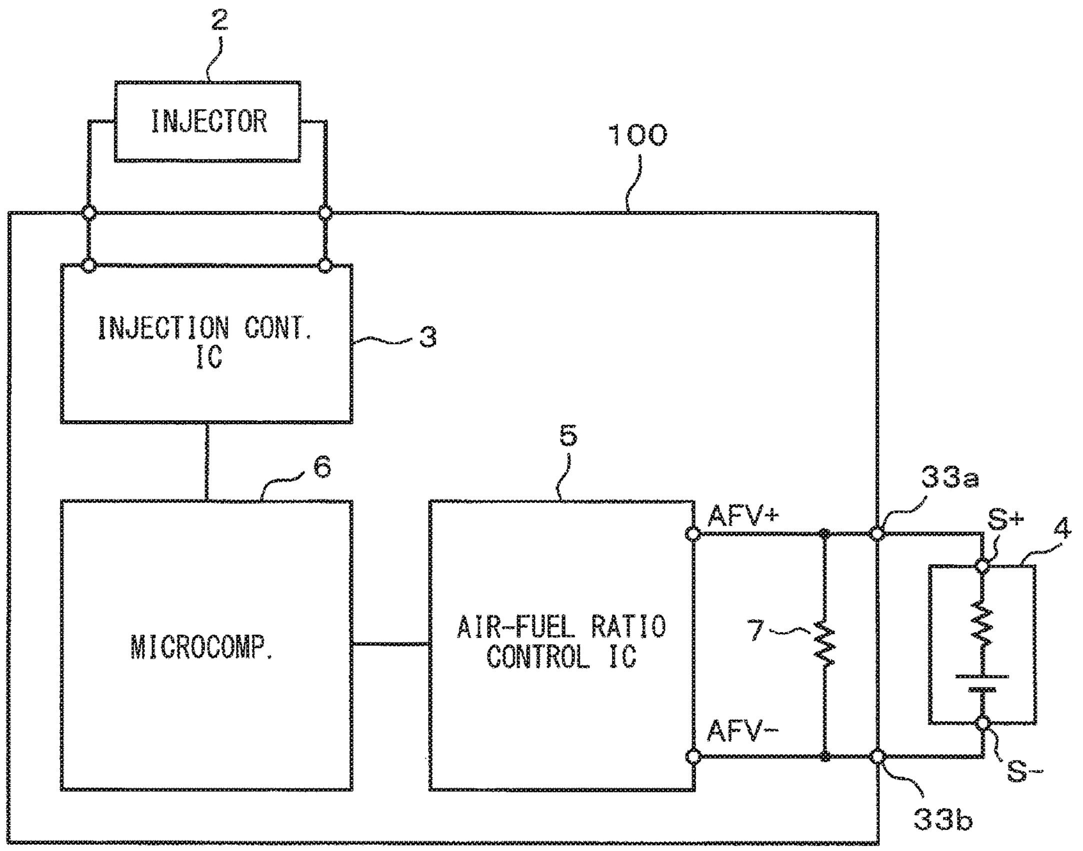
FIG. 1 is a block diagram of an electric configuration of a system in a first embodiment of the present disclosure.

FIGS. 1-10 show an example of the first embodiment of the present disclosure. The electric configuration of a control device 100 used as an engine Electronic Control Unit (ECU) is shown in FIG. 1 as a block diagram.

The control device 100 shown in FIG. 1 includes, as its main components, an injection control (IC) 3 that performs a fuel injection control of an injector 2 for use in an engine of an automotive vehicle, an air-fuel ratio control IC 5 that mainly performs various control processes of an air-fuel ratio sensor 4 that detects a ratio of oxygen in a detection object, i.e., an exhaust gas of the engine of the automotive vehicle to identify an air-fuel ratio, and a microcomputer 6 connected to the injection control IC 3 and to the air-fuel ratio control IC 5, and the control device 100 is configured to serve as an abnormality determination device.

In the control device 100, a resistor 7 for detecting an electromotive force generated in the air-fuel ratio sensor 4 is provided at a position between the air-fuel ratio control IC 5 and the air-fuel ratio sensor 4.

Figure 2:
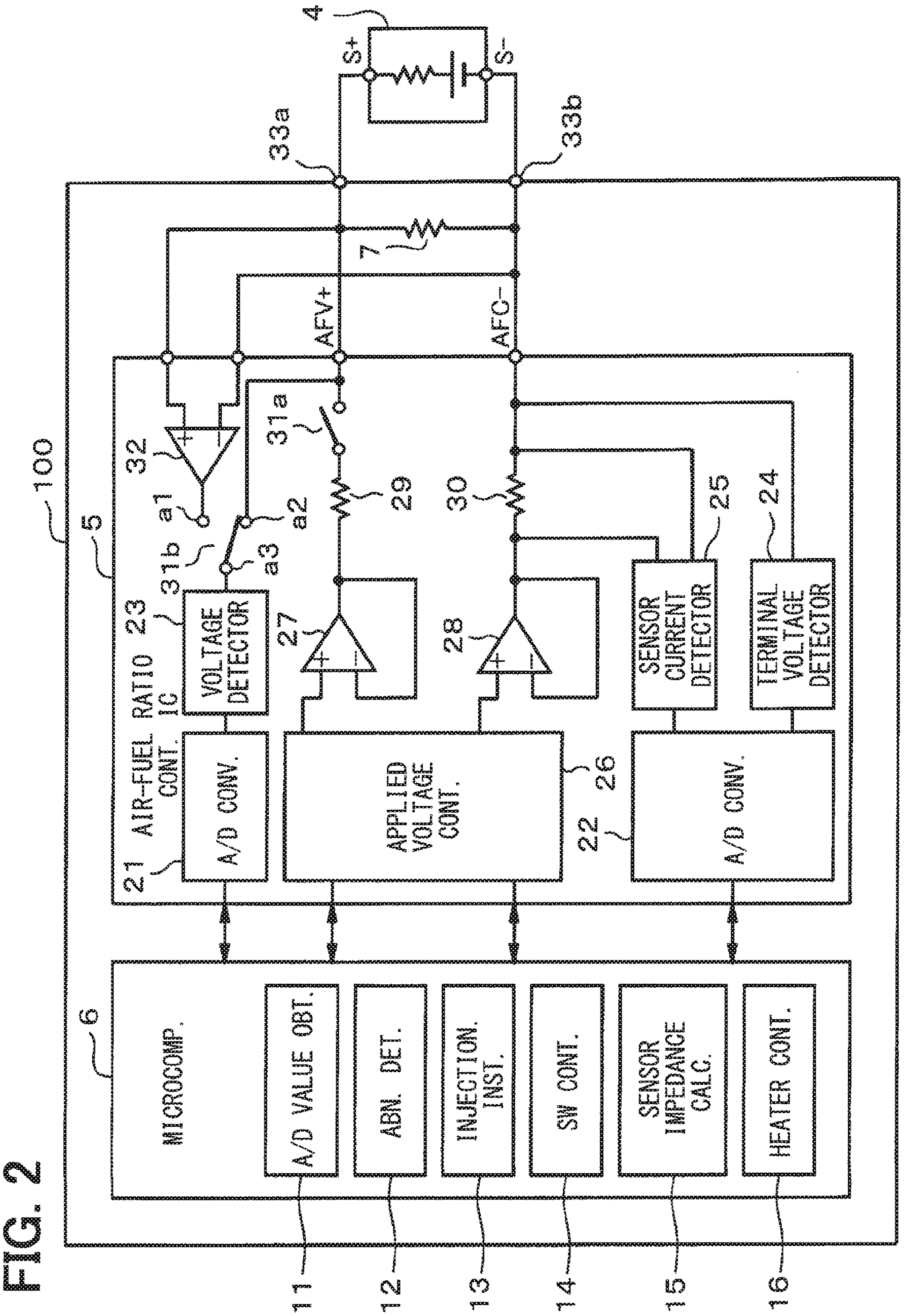
FIG. 2 is a block diagram of the electric configuration in a microcomputer and control-of-air-fuel-ratio IC.

The microcomputer 6 of the control device 100 in FIG. 2 executes a stored program stored in a non-transitive, substantive recording medium, with (not illustrated) Central Processing Unit (CPU), Read-Only Memory (ROM), Random Access Memory (RAM), etc. The method corresponding to the program is performed according to the execution of such program. The microcomputer 6 includes various functions such as an Analog-to-Digital (A/D) value obtainer 11, an abnormality determiner 12, an injection instructor 13, a switch controller 14, a sensor impedance calculator 15, and a heater controller 16.

The air-fuel ratio control IC 5 of the control device 100 includes A/D converters 21 and 22, a voltage detector 23, a terminal voltage detector 24, a sensor current detector 25, an application voltage controller 26, buffer amplifiers 27 and 28, a power supply limit resistor 29, a current sensing resistor 30, switches 31*a*, 31*b*, and a differential amplifying circuit 32, and forms a feedback control loop together with the microcomputer 6, and performs a control process and a protection process of the air-fuel ratio sensor 4.

A plus terminal S+ of the air-fuel ratio sensor 4 is connected to a plus terminal 33*a* of the control device 100, and a minus terminal S− of the air-fuel ratio sensor 4 is connected to a minus terminal 33*b* of the control device 100.

Figure 3A:
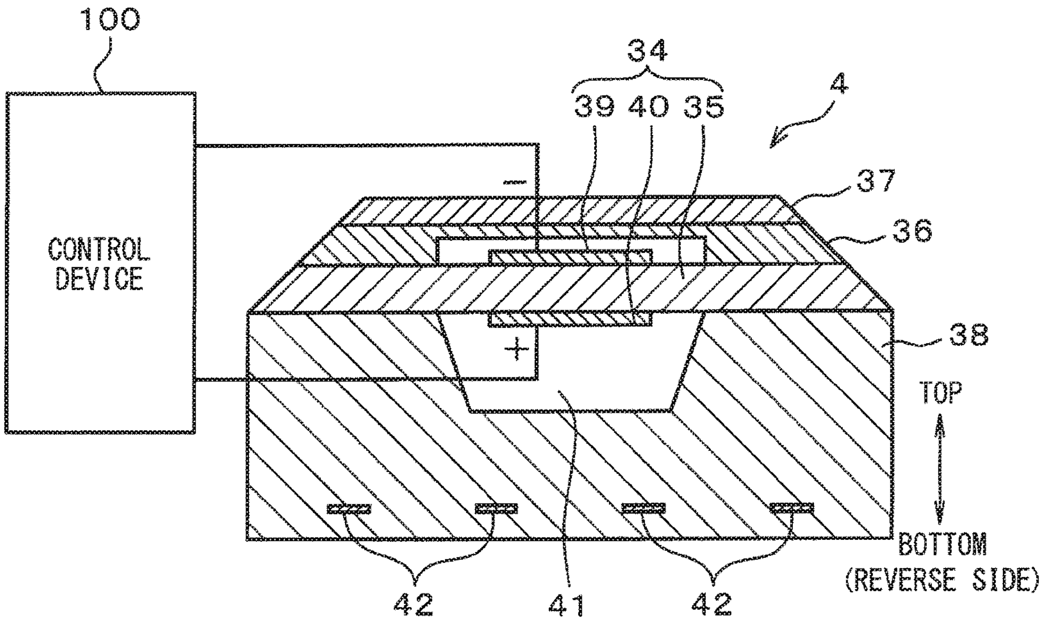
FIG. 3A is a vertical cross-sectional view of a main part of a one-cell type air-fuel ratio sensor.
Figure 3B:
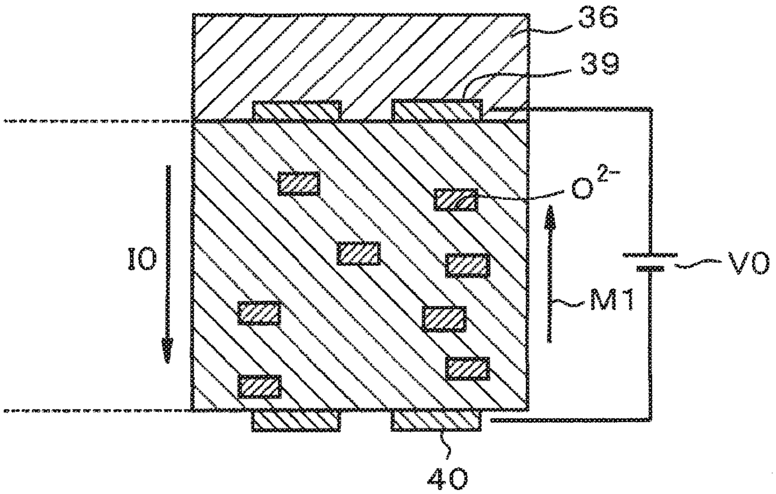
FIG. 3B is an illustration of principle of how an electric current flows in the air-fuel ratio sensor.

As shown in FIGS. 3A and 3B, the air-fuel ratio sensor 4 is provided with a sensor cell 34 that concretely detects a state of the gas contained in the exhaust gas of the internal-combustion engine. The air-fuel ratio sensor 4 has a solid electrolyte layer 35, a diffused resistor layer 36, a shield layer 37, and an insulation layer 38, and these layers are layered as shown in FIGS. 3A/B along a top-bottom direction and are fixed to form a one-cell type sensor.

The solid electrolyte layer 35 is provided as a rectangular plate-like sheet, for example.

The sensor cell 34 of the air-fuel ratio sensor 4 has electrodes 39 and 40 that bind the solid electrolyte layer 35 in an opposing manner.

The diffused resistor layer 36 is provided as a porous sheet for introducing the exhaust gas to the electrode 39, and the shield layer 37 is provided as a dense layer for controlling the penetration of the exhaust gas.

The insulation layer 38 is provided as a high-heat-conductivity ceramics, and has an atmospheric duct 41 at a position facing the electrode 40. The insulation layer 38 has a heater 42 buried therein.

The change, increase/decrease, of the element current of the sensor cell 34 of the air-fuel ratio sensor 4 corresponds to the change, increase/decrease, of the air-fuel ratio (lean/rich), i.e., when the air-fuel ratio becomes "lean", the element current increases, and when the air-fuel ratio becomes "rich", the element current decreases.

With reference to FIG. 2, the configuration of the air-fuel ratio control IC 5 of the control device 100 is described.

The application voltage controller 26 of the air-fuel ratio control IC 5 outputs a bias voltage to the buffer amplifier 27 in response to an instruction signal from the microcomputer 6, and outputs a bias to the plus terminal S+ through the buffer amplifier 27, the power supply limit resistor 29, the switch 31*a*, and the terminal 33*a*.

Similarly, the application voltage controller 26 outputs the bias voltage to the buffer amplifier 28 in response to the instruction signal from the microcomputer 6, and outputs a bias to the minus terminal S− through the buffer amplifier 28, the current sensing resistor 30, and the terminal 33*b*.

When the microcomputer 6 performs an operation instruction and detects a sensor signal of the air-fuel ratio sensor 4 by the air-fuel ratio control IC 5, the application voltage controller 26 applies a first preset voltage (e.g., 2.6 V), for example, to the plus terminal S+, and applies a second preset voltage (e.g., 2.2 V) to the minus terminal S−, for example.

In an inside of the control device 100, the resistor 7 is connected in parallel with the air-fuel ratio sensor 4. The resistor 7 is provided as a resistor with a resistance value of about 1.5-2 MΩ, for example, and the resistor 7 is provided in order to supply the electric current according to the electromotive force generated between the terminal S+ and the terminal S− of the air-fuel ratio sensor 4 when the switch 31*a* is opened.

The differential amplifying circuit 32 inputs an inter-terminal voltage between both terminals of the resistor 7 to both of difference input terminals, and to amplify such difference voltage, and outputs the amplified voltage to one of two terminals, i.e., to a fixed terminal a1, of the switch 31*b*.

The switch 31*b* is, for example, a selection input type switch provided with the fixed terminal a1 on one side and a fixed terminal a2 on the other side, and a moving terminal a3, and its switching control is enabled by the switch controller 14 of the microcomputer 6.

The plus terminal 33*a* of the control device 100 is electrically connected to the fixed terminal a2 on the other side of the switch 31*b*. Therefore, when the switch controller 14 of the microcomputer 6 performs the switching control of the switch 31*b*, the output voltage of the differential amplifying circuit 32 and the voltage of the plus terminal 33*a* are switched to be output to the voltage detector 23.

The voltage detector 23 corrects, or rectifies, the input voltage, and outputs the rectified voltage to the A/D converter 21, the A/D converter 21 converts the input from analog to digital, and outputs a digital value to the microcomputer 6.

The sensor current detector 25 receives an input of a voltage between both terminals of the current sensing resistor 30, amplifies the voltage, and outputs the amplified voltage to the A/D converter 22. The A/D converter 22 performs an analog-to-digital conversion of the voltage, and outputs a digital value to the microcomputer 6.

The terminal voltage detector 24 detects a voltage of the minus terminal S−, and outputs the detected voltage to the A/D converter 22, the A/D converter 22 performs an analog-to-digital conversion of the voltage, and outputs a digital value to the microcomputer 6.

The microcomputer 6 receives inputs of the digital value from the A/D converters 21 and 22.

As shown in FIG. 3B, when a bias is applied to the sensor cell 34 of the air-fuel ratio sensor 4, an electric current I0

(ai-zero) flows between the terminals S+ and S−, which moves an oxygen ion (O2−) in an opposite direction opposite to a flow direction of the electric current I0. That is, a move direction of the oxygen ion (O2−) is shown in FIG. 3B by an arrow M1.

The diffused resistor layer 36 acts against the above-described move of the oxygen ion (O2−), i.e., resisting/prohibiting the move of the ion.

Figure 4:
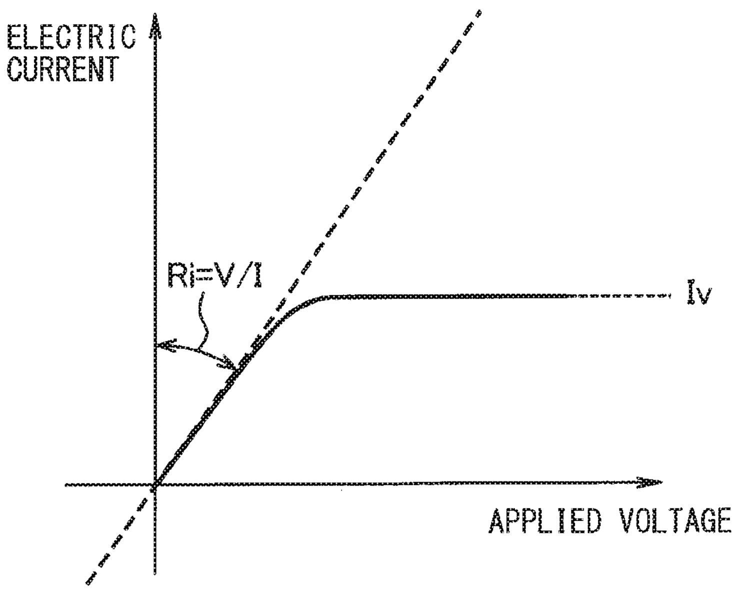
FIG. 4 is an illustration of a situation about a limit current range regarding the present disclosure.

Therefore, as shown in FIG. 4, according to the difference in the air-fuel ratio, respectively different limiting current regions Iv result.

The microcomputer 6 determines the current air-fuel ratio (i.e., an A/F value) by detecting the limiting current region Iv, and controls the detected air-fuel ratio (i.e., an A/F value) to be always brought to a stoichiometric value (e.g., 14.5).

The microcomputer 6 outputs an instruction signal to the application voltage controller 26 of the air-fuel ratio control IC 5, and adjusts the bias that the application voltage controller 26 applies to the plus terminal S+ and the minus terminal S−. Thereby, a feedback control is performable.

In the microcomputer 6 of the control device 100, various functions are provided, such as the sensor impedance calculator 15, the heater controller 16 and the like. In a certain period of time, a sweep voltage changed for a testing purpose is applied to the air-fuel ratio sensor 4, which enables a detection of a current change ΔI and a voltage change ΔV according to the sweep voltage, and ultimately enables calculation of a sensor impedance Ri (=ΔV/ΔI).

The microcomputer 6 performs a feedback control of the power supply to the heater 42 of the air-fuel ratio sensor 4 so that a sensor impedance Z is brought to a predetermined impedance based on a calculation result of the sensor impedance Z. Thereby, temperature T of the air-fuel ratio sensor 4 is adjusted. In such manner, the control device 100 is enabled to detect a sensor voltage, a sensor current, and an impedance Z of the air-fuel ratio sensor 4.

Hereafter, an abnormality determination process is described with reference to FIGS. 5, 6, and 7.

Figure 5:
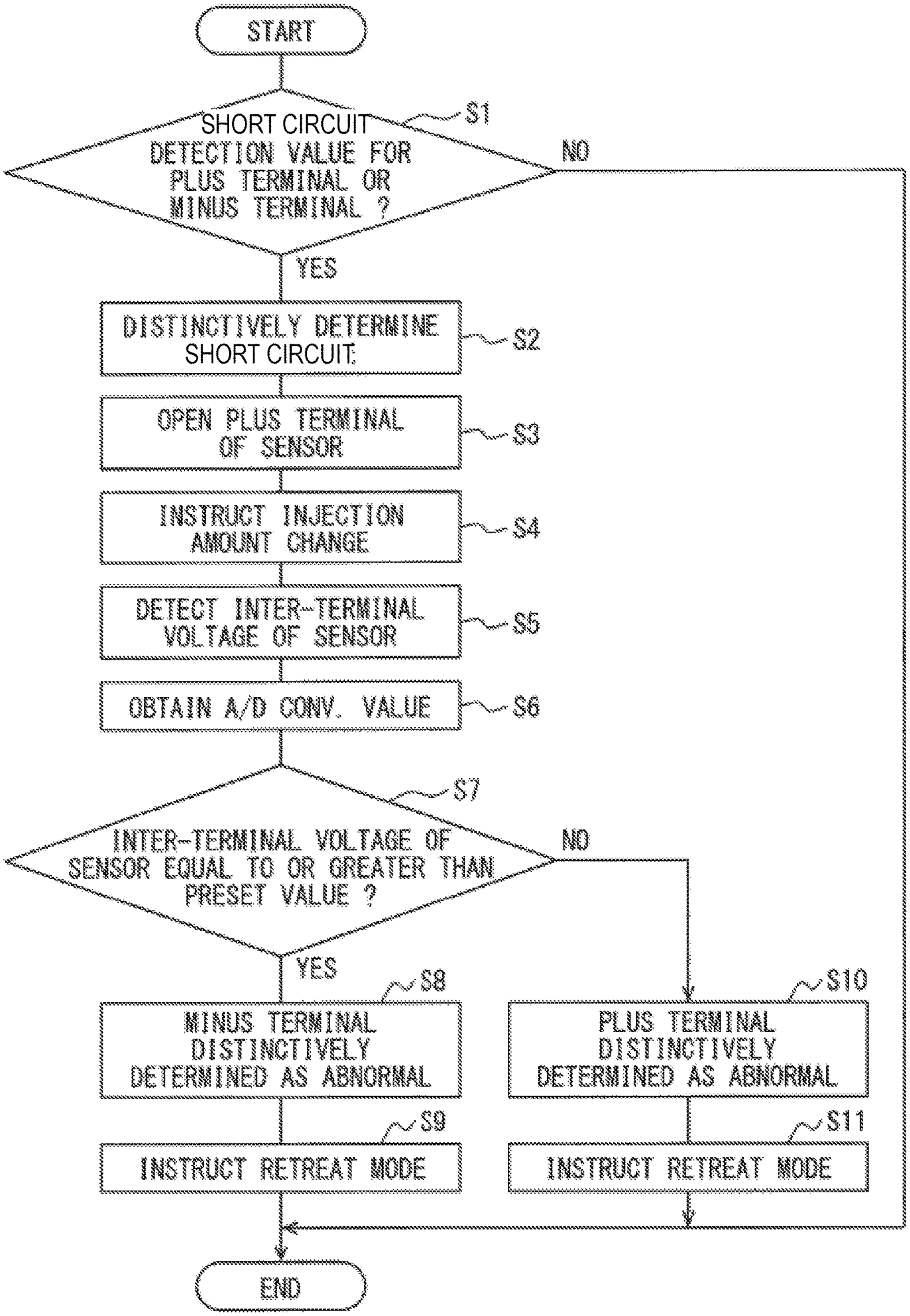
FIG. 5 is a flowchart of an abnormality determination process.
Figure 6:
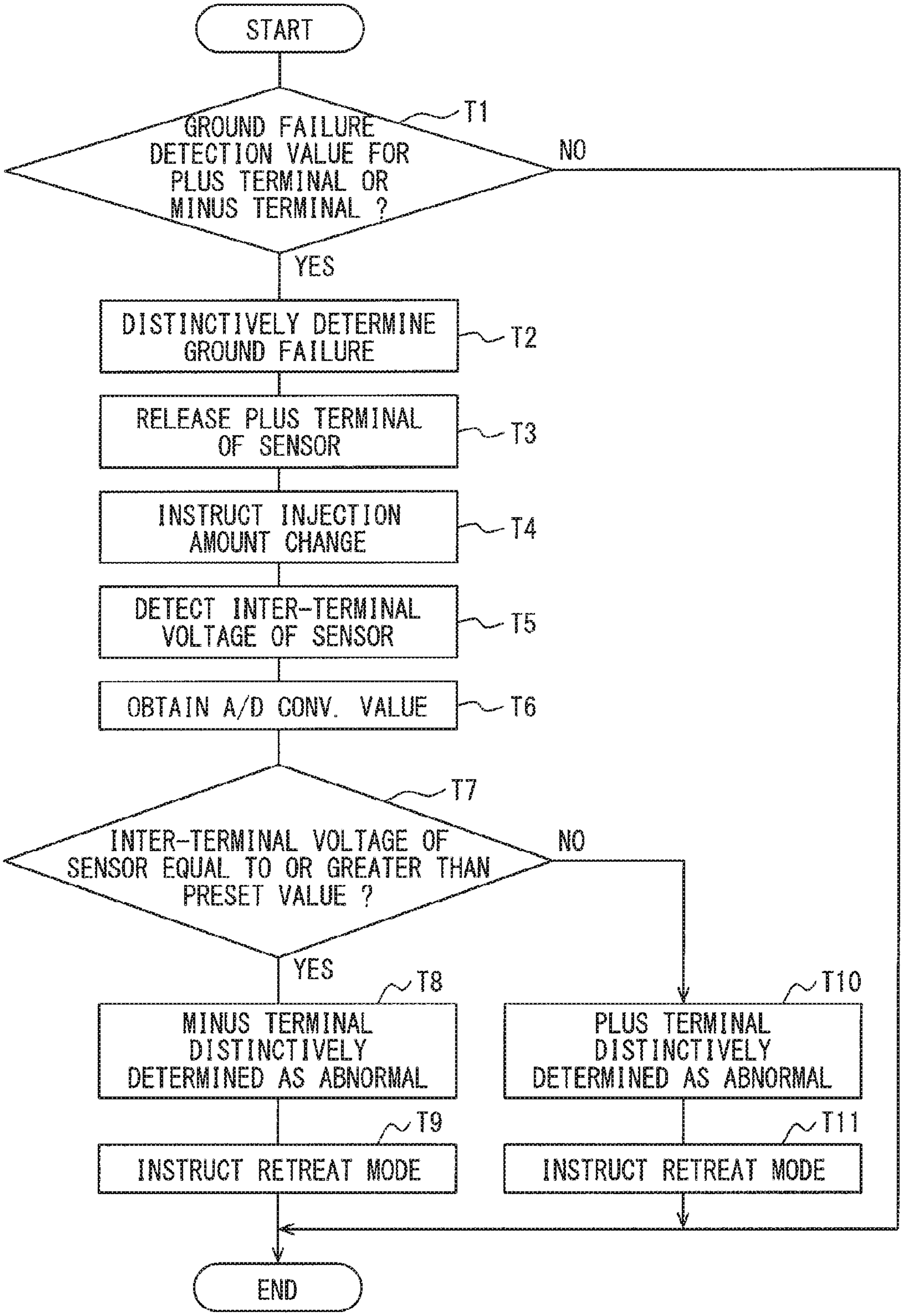
FIG. 6 is another flowchart the abnormality determination process.

The control device 100 performs the process shown in FIG. 5 and FIG. 6, when determining abnormality. More practically, FIG. 5 shows a short circuit to the power supply detection process and FIG. 6 shows a ground failure detection process. However, since the two processes in FIGS. 5 and 6 are overlapping for a large part, the same contents among the two processes are described at the same time. Further, FIG. 7 shows a flow of operation by using a timing chart.

The microcomputer 6 performs an ON switching of the switch 31*a* for sensor opening by using the switch controller 14, and outputs the instruction signal to the air-fuel ratio control IC 5.

Then, the air-fuel ratio control IC 5 applies a bias to each of the plus terminal S+ and the minus terminal S− of the air-fuel ratio sensor 4 (e.g., 2.6 V to the plus terminal, 2.2 V to the minus terminal), respectively, and, performs a control for a period between two timings t0 and t1.

At such timing, the microcomputer 6 sends an instruction of fuel injection amount to the injector 2, obtains the digital value of the voltage from the plus terminal S+ and the minus terminal S−, and controls the A/F value to be adjusted to the stoichiometric value (e.g., 14.5) by performing a feedback control.

During such period of control or during a control stop time, the short circuit to a power supply detection process of FIG. 5 and the ground failure detection process of FIG. 6 are performed.

That is, the microcomputer 6 determines, in Step S1 of FIG. 5 and in Step T1 of FIG. 6, whether a short circuit is detected according to the digital value of the voltage of the plus terminal S+ and the minus terminal S− obtained in the above-described manner. That is, at such timing, the microcomputer 6 determines whether the digital value is in a short circuit to a power supply detection range (e.g., +B=a battery voltage±a preset range) in Step S1 of FIG. 5, or determines whether the digital value is in a ground failure detection range (e.g., 0 V=a ground voltage±a preset range) in Step T1 of FIG. 6. In step S1 and step T1, the microcomputer 6 functions as a failure determiner in the claims.

The microcomputer 6 determines a short-circuit abnormality upon determining a fulfillment of a Step S1 condition or a fulfillment of a Step T1 condition, and when a short circuit to a power supply is detected, performs Step S2 of FIG. 5 and thereafter, or when a ground failure is detected, performs Step T2 of FIG. 6 and thereafter.

Figures 7, 8:
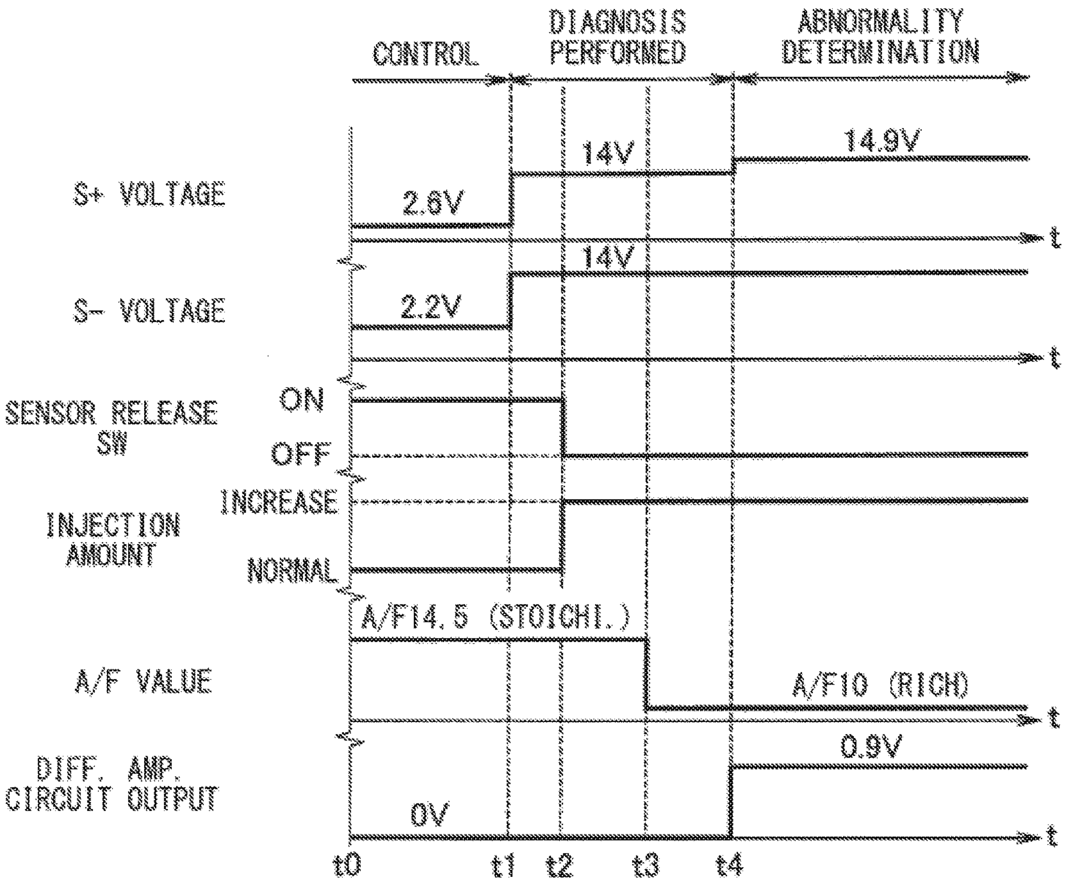
Figure 9:
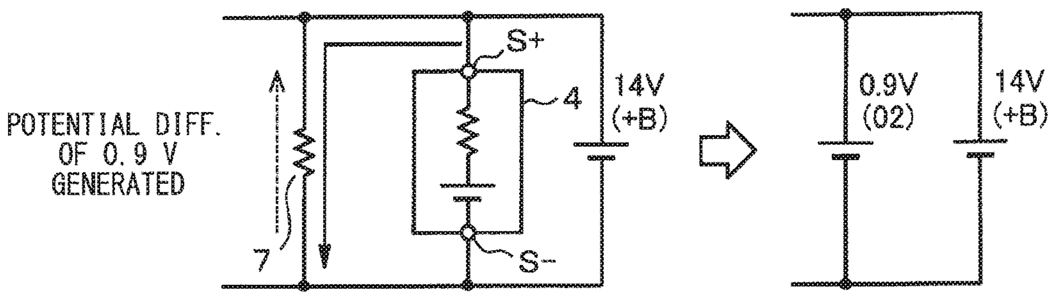
FIG. 9 is an illustration of a short circuit to a power supply of the plus terminal and an equivalent circuit.

For example, when a short circuit to a power supply is detected at timing t1 of FIG. 7, the microcomputer 6 distinctively determines a short circuit to a power supply in Step S2 of FIG. 5. The microcomputer 6 opens the plus terminal S+ of the air-fuel ratio sensor 4 by opening the switch 31*a*, using the switch controller 14 in Step S3 of FIG. 5. When the plus terminal S+ of the air-fuel ratio sensor 4 is opened, the air-fuel ratio sensor 4 performs the same operation as an oxygen sensor. Further, in Step S4, the microcomputer 6 performs, i.e., sends, a change instruction of fuel injection amount to the injection control IC 3 by using the injection instructor 13. The timing of such instruction is shown as timing t2 in FIG. 7.

Then, the injection control IC 3 increases the fuel injection amount, so that the air-fuel ratio in the exhaust gas is brought to the rich state at a period between two timings t2 and t3 of FIG. 7.

Then, the air-fuel ratio sensor 4 performs the same operation as the oxygen sensor. That is, the oxygen ion (O2−) is consumed when the oxygen ion (O2−) reacts to a carbon monoxide (CO) with a help of platinum (Pt) as a catalyst. When the oxygen ion (O2−) is consumed, a partial pressure of the oxygen lowers, the partial voltage on the exhaust side lowers, and thereby an electromotive force is generated.

At such timing, an electromotive force of about 0.9 V is observed, which is not ignorable as compared with the battery voltage +B of about 14 V. The electromotive force generated at the above timing is detectable via the resistor 7. Since the detected states of the electromotive force at the above timing is different according to a short-circuit state to the power supply or a ground failure of the plus terminal S+ and the minus terminal S−, by taking advantage of such difference between the detected states, an abnormality is distinctively determined in the present embodiment.

Note that, in an after timing t4 part of the timing chart of FIG. 7, the voltage value of each of various nodes at a time when the minus terminal S− has a short circuit to a power supply is shown.

When determining abnormality, the microcomputer 6 switches the switch 31*b* so that the output of the differential amplifying circuit 32 is detectable. At such timing, the microcomputer 6 switches the terminal a1 of the switch 31*b* to be connected to the terminal a3. Then, the voltage detector 23 of the air-fuel ratio control IC 5 detects the voltage between the two terminals (i.e., an inter-terminal voltage) of the air-fuel ratio sensor 4 in Step S5.

Then, the A/D converters 21 and 22 convert the detected values to the digital values, and the microcomputer 6 obtains the A/D-conversion value in Step S6.

In Step S7, the microcomputer 6 determines whether the voltage between the terminals of the air-fuel ratio sensor 4 is equal to or greater than the predetermined value (e.g., a battery voltage +B+0.5 V), and, when the voltage between the terminals is equal to or greater than the predetermined value (Step S7:YES), then, in Step S8, the microcomputer 6 distinctively determines that the abnormality has occurred in the minus terminal S− (i.e., the minus terminal S− is distinctively determined as abnormal), and, in Step S9, instructs transition to a retreat mode, as a fail-safe process.

At such timing, the microcomputer 6 instructs the air-fuel ratio control IC 5 and the injection control IC 3 to stop/invalidate the air-fuel ratio control in the retreat mode, thereby the control device 100 continues a fuel injection control process without performing an air-fuel ratio control process.

In Step S7, in case that the microcomputer 6 determines that the voltage between the terminals of the air-fuel ratio sensor 4 is less than the predetermined value (Step S7:NO), then, in Step S10, the microcomputer 6 distinctively determines that the abnormality has occurred in the plus terminal S+ (i.e., the plus terminal S+ is distinctively determined as abnormal), and, in Step S11, instructs transition to the retreat mode, as the fail-safe process.

At such timing, too, the microcomputer 6 instructs the air-fuel ratio control IC 5 and the injection control IC 3 to stop/invalidate the air-fuel ratio control in the retreat mode, thereby the control device 100 continues a fuel injection control process without performing an air-fuel ratio control process.

On the other hand, when a ground failure is detected, the microcomputer 6 distinctively determines a ground failure in Step T2 of FIG. 6, then, the microcomputer 6 opens the plus terminal S+ of the air-fuel ratio sensor 4 by opening the switch 31*a* by using the switch controller 14 in Step T3 of FIG. 6. Then, in Step T4, the microcomputer 6 performs the change instruction of fuel injection amount by using the injection instructor 13. In case of controlling the air-fuel ratio is being adjusted the stoichiometric value, the microcomputer 6 increases the fuel injection amount to bring the air-fuel ratio in the exhaust gas to the rich state. Then, an electromotive force is generated in the air-fuel ratio sensor 4, which is detectable as a voltage via the resistor 7.

The microcomputer 6 switches the switch 31*b* so that the output of the differential amplifying circuit 32 is detectable. Then, the voltage detector 23 of the air-fuel ratio control IC 5 detects the voltage between the terminals (i.e., the inter-terminal voltage) of the air-fuel ratio sensor 4 in Step T5.

Then, the detected voltage between the terminals of the air-fuel ratio sensor 4 is converted by the A/D converter 21 to the digital value and is outputted therefrom, and the microcomputer 6 obtains the A/D-conversion value in Step T6.

In Step T7, the microcomputer 6 determines whether the voltage between the terminals of the air-fuel ratio sensor 4 is equal to or greater than the predetermined value, and, when the voltage between the terminals is equal to or greater than the predetermined value, then, in Step T8, the microcomputer 6 distinctively determines that abnormality has occurred in the minus terminal S− (i.e., the minus terminal S− is distinctively determined as abnormal), and, in Step T9, instructs transition to the retreat mode, as the fail safe process.

At such timing, the microcomputer 6 instructs the air-fuel ratio control IC 5 and the injection control IC 3 to stop/invalidate the air-fuel ratio control in the retreat mode, thereby the control device 100 continues a fuel injection control process without performing an air-fuel ratio control process.

In Step T7, in case that the microcomputer 6 determines that the voltage between the terminals is less than the predetermined value (Step T7:NO), then, in Step T10, the microcomputer 6 distinctively determines that the abnormality has occurred in the plus terminal S+ (i.e., the plus terminal S+ is distinctively determined as abnormal), and, in Step T11, instructs transition to the retreat mode, as the fail-safe process.

At such timing, too, the microcomputer 6 instructs the air-fuel ratio control IC 5 and the injection control IC 3 to stop/invalidate the air-fuel ratio control in the retreat mode. Thereby the control device 100 continues a fuel injection control process without performing an air-fuel ratio control process.

<Voltage Generation Principle in Plus/Minus Terminal at Sky/Ground Failure Time>

The reason of why abnormality is distinctively determinable when the above-described flow of processes is performed is explained below.

When the plus terminal S+ has a short circuit to a power supply, or when the minus terminal S− has a short circuit to a power supply, the reference voltages shown in FIG. 8 are respectively generated in the plus terminal S+ and the minus terminal S−.

When the plus terminal S+ of the air-fuel ratio sensor 4 has a short circuit to a power supply, the battery voltage +B is applied to the plus terminal S+. As shown in an equivalent circuit of FIG. 9 at a time of when the plus terminal S+ has a short circuit to a power supply, the electromotive force of the air-fuel ratio sensor 4 and the battery voltage +B are describable as equivalent to each other, i.e., as two elements connected in parallel.

That is, even when an electromotive force of about 0.9 V is generated in the air-fuel ratio sensor 4, a greater battery voltage +B of about 14 V is generated in the plus terminal S+, which reduces the generated electromotive force to an ignorable level. Therefore, a voltage equivalent to the battery voltage +B is generated in the plus terminal S+.

Further, in the minus terminal S−, an electric potential having a drop from the battery voltage +B by an amount of in internal resistance of the air-fuel ratio sensor 4 results. Therefore, such an electric potential is a minutely-dropped voltage from the battery voltage +B, i.e., a substantially-same voltage as the battery voltage +B that has occurred in the minus terminal S−.

Further, when the minus terminal S− of the air-fuel ratio sensor 4 has a short circuit to a power supply, the battery voltage +B is applied to the minus terminal S− based on a ground level, which is a reference voltage.

Figure 10:
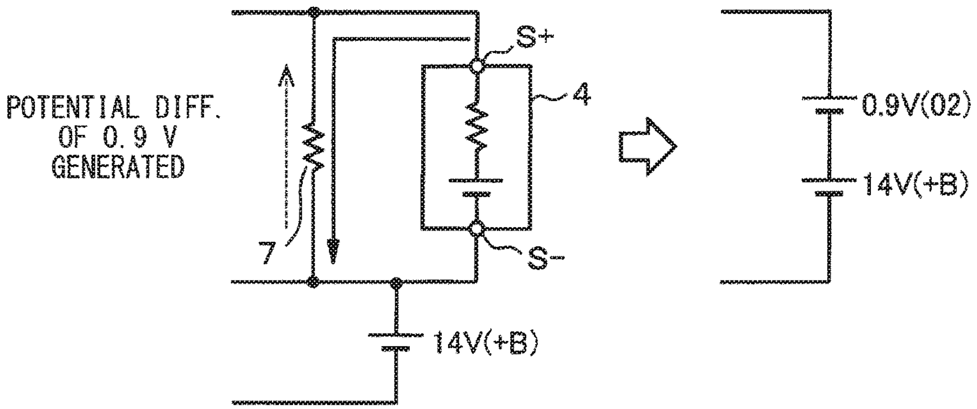
FIG. 10 is an illustration of a ground failure of the minus terminal and an equivalent circuit.

As shown in an equivalent circuit of FIG. 10 at a time of when the minus terminal S− has a short circuit to a power supply, the electromotive force of the air-fuel ratio sensor 4 and the battery voltage +B are describable as equivalent to each other, i.e., as two elements connected in series.

That is, when the air-fuel ratio sensor 4 generates the electromotive force of about 0.9 V, the voltage in the plus terminal S+ is generated as a sum of the battery voltage +B+0.9 V=14.9 V, and the voltage in the minus terminal S− is generated as the battery voltage +B.

Therefore, by determining an abnormality based on a comparison between the inter-terminal voltage of the air-fuel ratio sensor 4 and the predetermined value (e.g., the battery voltage +B+0.5 V) in Step S7 of FIG. 5, the microcomputer 6 can correctly and distinctively determine which one of the minus terminal S− or the plus terminal S+ has the abnormality.

Further, when the plus terminal S+ has a ground failure, or when the minus terminal S− has a ground failure, the voltages generated in the plus terminal S+ and the minus terminal S− are respectively observed as shown in FIG. 8.

When the plus terminal S+ of the air-fuel ratio sensor 4 has a ground failure, a ground potential is applied to the plus terminal S+. The voltage of the minus terminal S− becomes substantially equal to the ground potential under an influence of the voltage of this the plus terminal S+.

Further, when the minus terminal S− of the air-fuel ratio sensor 4 has a ground failure, while the minus terminal S− is set to the ground potential, the electromotive force of about 0.9 V is generated in the plus terminal S+ by the air-fuel ratio sensor 4.

Therefore, by determining the abnormality based on a comparison between the inter-terminal voltage of the air-fuel ratio sensor 4 and the predetermined value (e.g., 0.5 V) in Step T7 of FIG. 6, the microcomputer 6 can correctly and distinctively determine which one of the minus terminal S− or the plus terminal S+ has the abnormality.

As described above, according to the present embodiment, the injection instructor 13 brings the air-fuel ratio in the exhaust gas to the rich state by sending an adjustment instruction, which adjusts the fuel injection amount of the injector 2 together with the stopping of an application of a bias to the plus terminal S+, and the abnormality determiner 12 detects the electromotive force generated in the air-fuel ratio sensor 4 when the air-fuel ratio in the exhaust gas is brought to the rich state by the injection instructor 13, and distinctively determines which one of the plus terminal S+ or the minus terminal S− has a short circuit to a power supply or a ground failure according to the value of the electromotive force.

Thereby, it may be determined which one of the plus terminal S+ or the minus terminal S− has a short-circuit. Further, a required time for a trouble-shooting is reduced, in identifying the abnormality in the air-fuel ratio sensor 4, which leads to the cost/time reduction in the repair work.

Further, the resistor 7 is connected in parallel with the air-fuel ratio sensor 4 for obtaining the electromotive force. In such manner, the detection mechanism is configured as a smallest possible circuit.

Further, the microcomputer 6 obtains the electromotive force by detecting the difference of the voltages, i.e., a difference between a voltage of the plus terminal S+ and a voltage of the minus terminal S−, and distinctively determines abnormality according to the obtained electromotive force.

Therefore, the electromotive force is detectable without an influence of looseness of the plus terminal S+ and the minus terminal S−, and without an influence of variation of various elements in near-by circuits, both of which result in an improved detection accuracy of the electromotive force.

Second Embodiment

Figure 11:
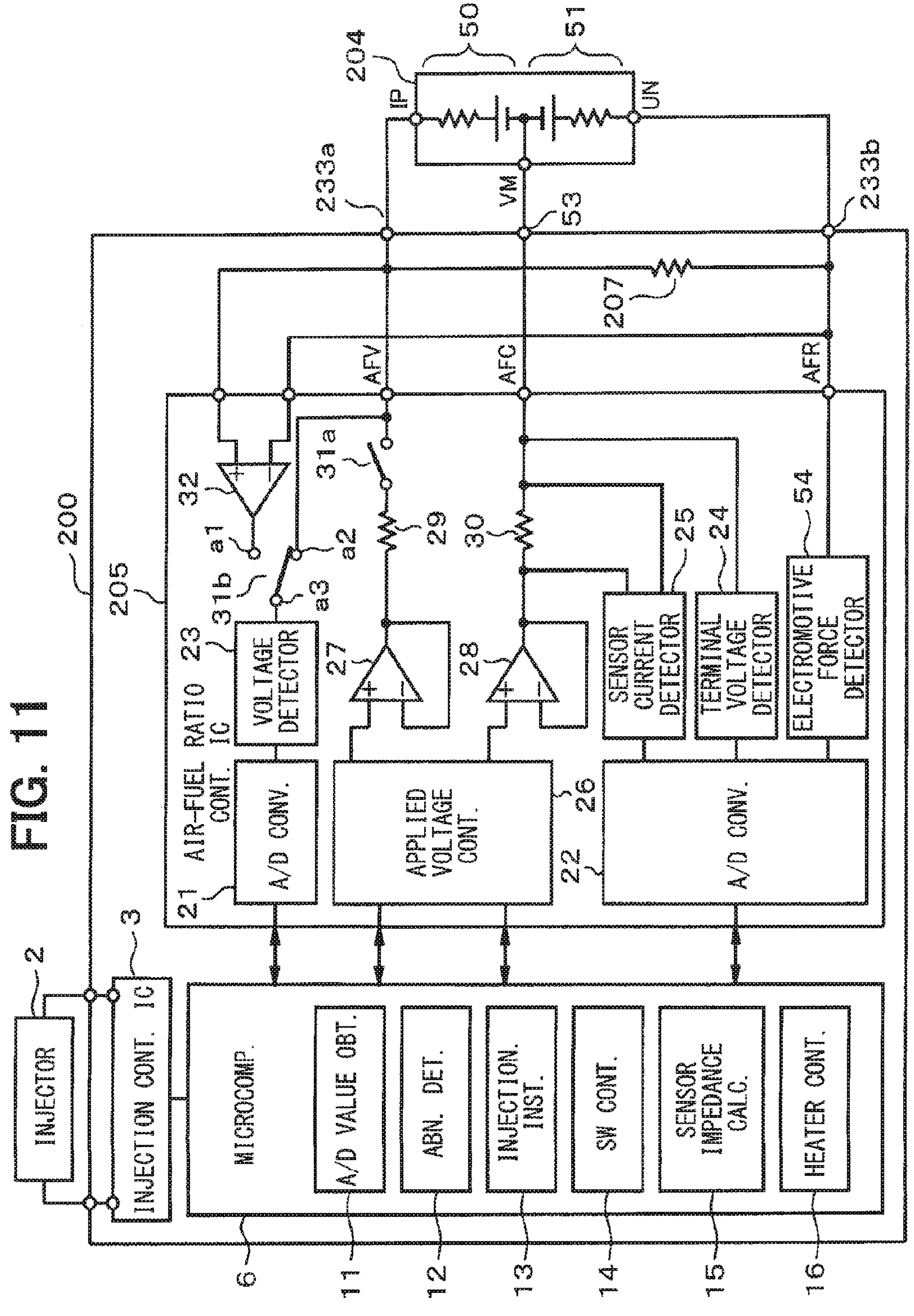
FIG. 11 is a block diagram of an electric configuration of a system in a second embodiment of the present disclosure.
Figure 12:
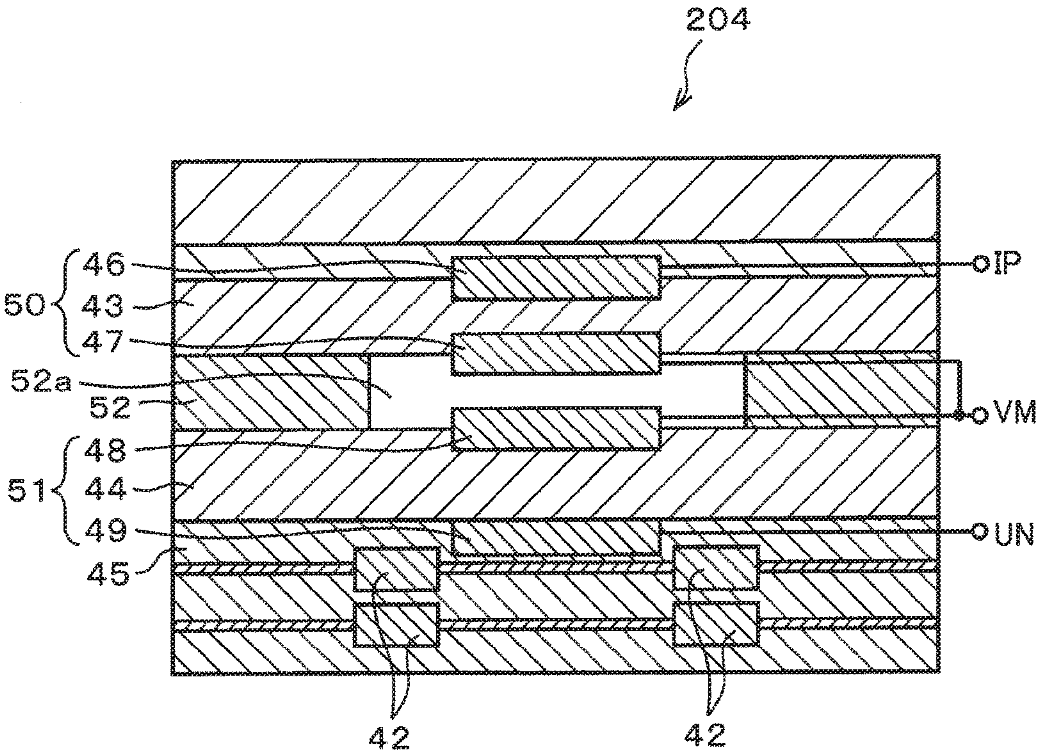
FIG. 12 is a vertical cross-sectional view of the main part of a two-cell type air-fuel ratio sensor.

FIGS. 11 and 12 are additional drawings for the description/explanation of the second embodiment.

The second embodiment shows an example of an application of the present disclosure to a control device 200 for controlling an air-fuel ratio sensor 204 having two cells.

More practically, FIG. 11 shows an example of electric configuration of the control device 200, and FIG. 12 shows an example of configuration of the air-fuel ratio sensor 204 having two cells.

As shown in FIG. 12, the air-fuel ratio sensor 204 is provided with three solid electrolyte layers 43, 44, and 45, and the solid electrolyte layer 43 has a pair of electrodes 48 and 47 disposed thereon in an opposing manner, and the solid electrolyte layer 44 has a pair of electrodes 48 and 49 disposed thereon in an opposing manner.

In such element structure of the air-fuel ratio sensor 204, a pump cell 50 is made up from the solid electrolyte layer 43 and the electrodes 46 and 47, and an electromotive force cell 51 is made up from the solid electrolyte layer 44 and the electrodes 48 and 49.

The electromotive force cell 51 is a so-called oxygen detection cell, or an oxygen density detector cell.

The pump cell 50 and the electromotive force cell 51 make up the air-fuel ratio sensor 204 in the second embodiment.

A porous diffusion layer 52 is disposed at a position between the solid electrolyte layers 43 and 44, a space is defined at a position between the solid electrolyte layers 43 and 44 in an area surrounded by the porous diffusion layer 52, which serves as a gas detection chamber 52*a*. The gas detection chamber 52*a* is configured as an introduction hole of the exhaust gas. Further, the heater 42 is provided at a position in a proximity of the pump cell 50 and the electromotive force cell 51.

The electrode 46 is connected to a terminal IP that serves as a plus terminal, and the electrode 49 is connected to a terminal UN that serves as a minus terminal.

Further, the electrodes 47 and 48 are both connected to a terminal VM, and the terminals IP, VM, and UN of the air-fuel ratio sensors 204 are connected to terminals 233*a*, 53, and 233*b* of the control device 200, respectively.

The pump cell 50 and the electromotive force cell 51 are illustrated in a schematic electric diagram as shown in FIG. 11.

As shown in FIG. 11, an air-fuel ratio control IC 205 of the control device 200 includes, together with the A/D converter 21, the voltage detector 23, the terminal voltage detector 24, the sensor current detector 25, the application voltage controller 26, the buffer amplifiers 27 and 28, the power supply limit resistor 29, the current sensing resistor 30, the switch 31*a*, 31*b* and the differential amplifying circuit 32, an electromotive force detector 54, and forms a feedback control loop with the microcomputer 6, and performs a control process and a protection process of the air-fuel ratio sensor 204.

The basic configuration of the control device 200 is the same as the first embodiment. A resistor 207 for a detection of electromotive force is connected at a position between the terminal IP and the terminal UN.

The electromotive force detector 54 is connected to detect an electromotive force of the electromotive force cell 51 that changes according to the change of the air-fuel ratio from the terminal UN via the terminal 233*b*.

Further, the switch 31*a* is disposed at a position between the terminal IP of the pump cell 50 and the buffer amplifier 27, and establishes a connection between the buffer amplifier 27 and the terminal IP based on a control by the switch controller 14 of the microcomputer 6, and diverts the output of the buffer amplifier 27 away from the terminal IP when the abnormality determination process is performed (i.e., not sending the output to the terminal IP).

Further, the microcomputer 6 receives an input of the detection value of the sensor current detector 25, an input of the detection value of the terminal voltage detector 24, and an input of the detection value of the terminal UN of the electromotive force cell 51 via the A/D converter 22, and detects the limiting current region Iv shown in FIG. 4 according to those input values for determining the current air-fuel ratio (i.e., the A/F value), and outputs the instruction signal to the air-fuel ratio control IC 205.

The application voltage controller 26 of the air-fuel ratio control IC 205 applies the positive or negative voltage to the pump cell 50 according to the instruction signal, for the supply of the electric current to the pump cell 50.

When the air-fuel ratio (i.e., the A/F value) is in the lean state, the electric current flows towards the electrode 46 from the electrode 47 because the oxygen ion (O2−) moves towards the electrode 47 from the electrode 46.

At such timing, the microcomputer 6 outputs the instruction signal to the application voltage controller 26, and applies a positive voltage between the terminals IP-VM by an application of high potential to the terminal IP and by an application of low potential to the terminal VM.

Thereby, the control device 200 performs an adjustment control to always bring the electromotive force generated between the electrodes 48 and 49 of the electromotive force cell 51 to the stoichiometric value (e.g., 0.45 V).

When the air-fuel ratio (i.e., the A/F value) is the rich state, the electric current flows towards the electrode 47 from the electrode 46 because the oxygen ion (O2−) moves towards the electrode 46 from the electrode 47.

At such timing, the microcomputer 6 outputs the instruction signal to the application voltage controller 26, and applies a negative voltage between the terminals IP-VM by an application of the low voltage to the terminal IP and by an application of the high potential to the terminal VM.

Thereby, just like a situation described above, an adjustment control is performed to always bring the electromotive force that is generated between the electrodes 48 and 49 of the electromotive force cell 51 to the stoichiometric value (e.g., 0.45 V).

At such timing, by the adjustment of the amount of the move of the oxygen ion, the electromotive force generated in the electromotive force cell 51 is always controlled to be the stoichiometric level (e.g., 0.45 V).

In the abnormality determination process, in the same manner as the method described with reference to FIGS. 5-7 in the first embodiment, by detecting the change of the voltage of the terminal IP that serves as the plus terminal, the abnormality is distinctively detectable. Therefore, details of the detection method are omitted from the second embodiment.

As described in detail in the above, even when the air-fuel ratio sensor 204 having two cells is used in the present embodiment, the abnormality determination process is performable.

OTHER EMBODIMENTS

The present disclosure is not limited to the embodiment mentioned above, and may be modifiable to have various forms, i.e., may be described as various embodiments as long as the gist of the disclosure pertains to the basic idea of the disclosure.

For example, the modification or extension described below is feasible.

For example, although, in the first embodiment, the voltage between the terminals S+ and S− is detected by the differential amplifying circuit 32 for the distinctive determination of the abnormality, such a configuration may be modifiable.

Figure 13:
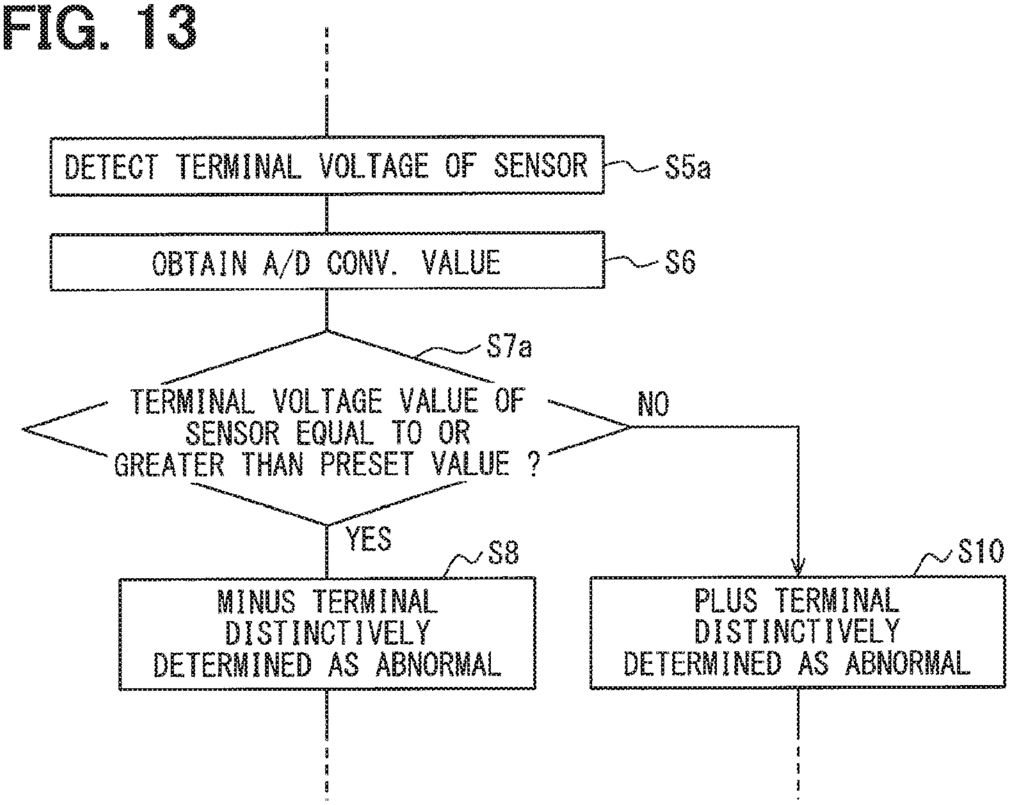
FIG. 13 is a flowchart of the abnormality determination process in other embodiment of the present disclosure.
Figure 14:
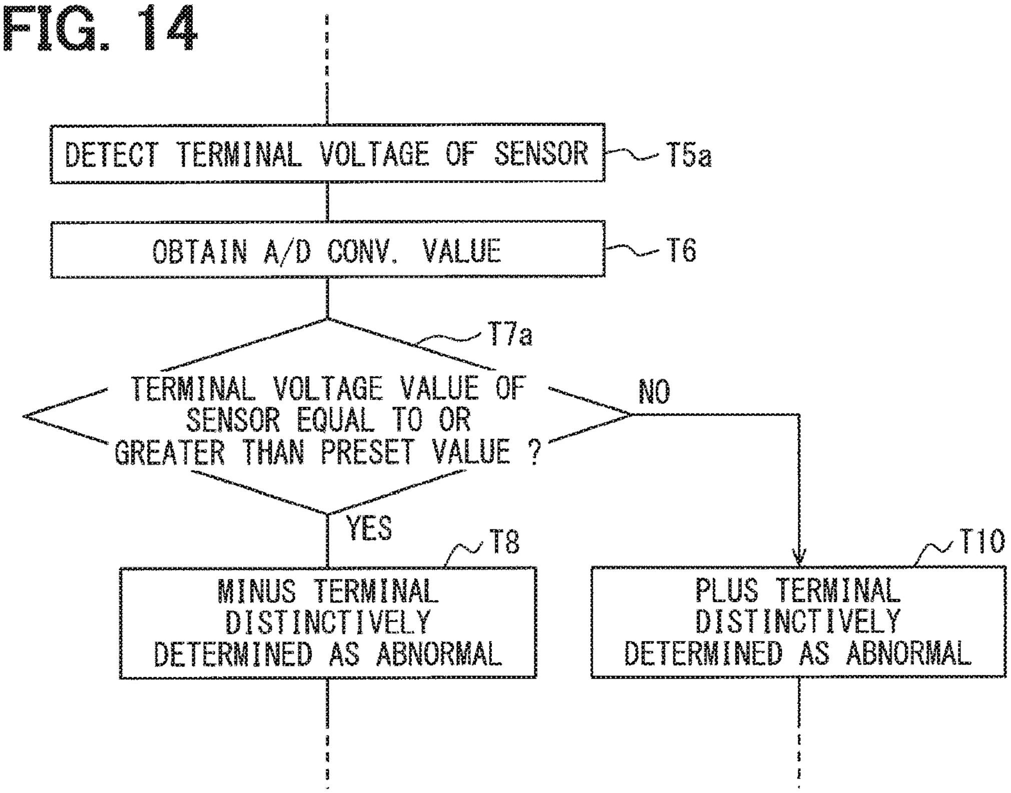
FIG. 14 is another flowchart of the abnormality determination process in the other embodiment of the present disclosure.

For example, as shown in FIG. 13 that partially replaces FIG. 5 and as shown in FIG. 14 that partially replaces FIG. 6, in Step S5*a* and T5*a*, the microcomputer 6 may detect either (i) the terminal voltage of the plus terminal S+ of the air-fuel ratio sensor 204 or (ii) the terminal voltage of the minus terminal S− of the air-fuel ratio sensor 204, and, in Step S7*a* and T7*a*, the microcomputer 6 may compare the detected voltage with a preset voltage (e.g., with the battery voltage +B+0.5 V, or with 0.5 V), for the distinctive determination of abnormality, in terms of determining which one of the plus terminal S+ or the minus terminal S− has a short circuit to a power supply or a ground failure.

Further, the function of the microcomputer 6 may be partially or entirely born by only one IC, or may be born by plural ICS, or may be provided by ASIC or the like.

The above-described embodiments may be combined to have a different embodiment.

Although the present disclosure has been described in connection with preferred embodiment thereof with reference to the accompanying drawings, it is to be noted that various changes and modifications become apparent to those skilled in the art, and such switches, modifications, and summarized schemes are to be understood as being within the scope of the present disclosure as defined by appended claims.

What is claimed is:

1. An abnormality determination device configured to determine abnormality of an air-fuel ratio sensor that detects an air-fuel ratio in an exhaust gas of an internal combustion engine, the air-fuel ratio sensor having a plus terminal and a minus terminal, and send an instruction to apply a bias to the plus terminal and the minus terminal of the air-fuel ratio sensor, the abnormality determination device comprising:

an injection instructor configured to (i) adjust a fuel injection amount from an injector and (ii) stop an application of the bias to the plus terminal to bring the air-fuel ratio in the exhaust gas to a rich state; and an abnormality determiner configured to (i) detect an electromotive force of the air-fuel ratio sensor when the air-fuel ratio in the exhaust gas is brought to the rich state by the injection instructor, and (ii) determine which one of the plus terminal or the minus terminal has a short circuit to a power supply or a ground failure, according to the detected electromotive force of the air-fuel ratio sensor.

2. The abnormality determination device of claim 1, further comprising:

a resistor connected at a position between the plus terminal and the minus terminal in parallel with the air-fuel ratio sensor to obtain the electromotive force, wherein the abnormality determiner is further configured to determine the abnormality according to the electromotive force generated in the resistor.

3. The abnormality determination device of claim 1, wherein the abnormality determiner is further configured to obtain the electromotive force and determine the abnormality according to the detected electromotive force by detecting an inter-terminal voltage between the plus terminal and the minus terminal of the air-fuel ratio sensor.

4. The abnormality determination device of claim 1, wherein the abnormality determiner is further configured to determine the abnormality by detecting a voltage of the plus terminal and a voltage of the minus terminal of the air-fuel ratio sensor, and by comparing the detected terminal voltage with a preset value.

5. The abnormality determination device of claim 1, wherein the air-fuel ratio sensor includes a one-celled air-fuel ratio sensor for detecting a sensor voltage, a sensor current, and an impedance.

6. The abnormality determination device of claim 1, wherein the air-fuel ratio sensor includes a two-celled air-fuel ratio sensor having a pump cell and an electromotive force cell connected in series at a position between the plus terminal and the minus terminal, for detecting a sensor voltage, a sensor current and an impedance.

7. The abnormality determination device of claim 1 further comprising:

a failure determiner configured to determine whether the voltages of the plus terminal and the minus terminal are within a short circuit to the power supply detection range and a ground failure detection range before determining the abnormality of the air-fuel ratio sensor, wherein the abnormality determiner is further configured to perform an abnormality determination process for determining the abnormality based on the failure determiner determining that one of the voltages of the plus terminal or the minus terminal is within the short circuit to the power supply detection range or the ground failure detection range.

8. An abnormality determination system, comprising:

an abnormality determination device configured to determine an abnormality of an air-fuel ratio sensor that detects an air-fuel ratio of an exhaust gas of an internal combustion engine, the air-fuel ratio sensor having a plus terminal and a minus terminal, and send an instruction to apply a bias to the plus terminal and the minus terminal of the air-fuel ratio sensor, the abnormality determination device having:

an injection instructor configured to (i) adjust a fuel injection amount from an injector and (ii) stop an application of the bias to the plus terminal to bring the air-fuel ratio of the exhaust gas to a rich state; and an abnormality determiner configured to (i) detect an electromotive force of the air-fuel ratio sensor when the air-fuel ratio of the exhaust gas is brought to the rich state by the injection instructor, and (ii) determine which one of the plus terminal or the minus terminal has a short circuit to a power supply or a ground failure, according to the detected electromotive force of the air-fuel ratio sensor.

9. An abnormality determination device, comprising:

an injection instructor configured to (i) adjust a fuel injection amount from an injector and (ii) stop an application of a bias to a plus terminal of an air-fuel ratio sensor to bring an air-fuel ratio of an exhaust gas detected by the air-fuel ratio sensor to a rich state; and an abnormality determiner configured to (i) detect an electromotive force of the air-fuel ratio sensor when the air-fuel ratio in the exhaust gas is brought to the rich state by the injection instructor, and (ii) determine which one of the plus terminal or a minus terminal of the air-fuel ratio sensor has a short circuit to a power supply or a ground failure, according to the detected electromotive force of the air-fuel ratio sensor.

* * * * *